United States Patent [19]
Suter

[11] 3,885,538
[45] May 27, 1975

[54] ENGINE AIR PUMP PRESSURE/MANIFOLD VACUUM CONTROLLED EXHAUST GAS RECIRCULATING CONTROL SYSTEM

[75] Inventor: Mark H. Suter, Northville, Mich.
[73] Assignee: Ford Motor Company, Dearborn, Mich.
[22] Filed: Dec. 3, 1973
[21] Appl. No.: 421,382

[52] U.S. Cl.................. 123/119 A; 60/278; 60/290
[51] Int. Cl............................................ F02b 33/00
[58] Field of Search .......... 123/119 A; 60/290, 305, 60/278, 289, 304, 305, 306, 307

[56] References Cited
UNITED STATES PATENTS

| | | | |
|---|---|---|---|
| 2,722,927 | 11/1955 | Cornelius | 123/119 A |
| 3,542,004 | 11/1970 | Cornelius | 123/119 A |
| 3,796,049 | 3/1974 | Hayashi | 60/278 |
| 3,797,803 | 3/1974 | Goto | 123/119 A |

Primary Examiner—Charles J. Myhre
Assistant Examiner—Daniel J. O'Connor
Attorney, Agent, or Firm—Robert E. McCollum; Keith L. Zerschling

[57] ABSTRACT

The engine has an air pump supplying air to the exhaust ports for emission control; the engine also has a duct connecting the exhaust gas crossover passage to the intake manifold, the duct normally being opened by a load and speed sensitive valve whenever air pump pressure exceeds manifold vacuum by a predetermined amount.

5 Claims, 3 Drawing Figures

PATENTED MAY 27 1975  3,885,538
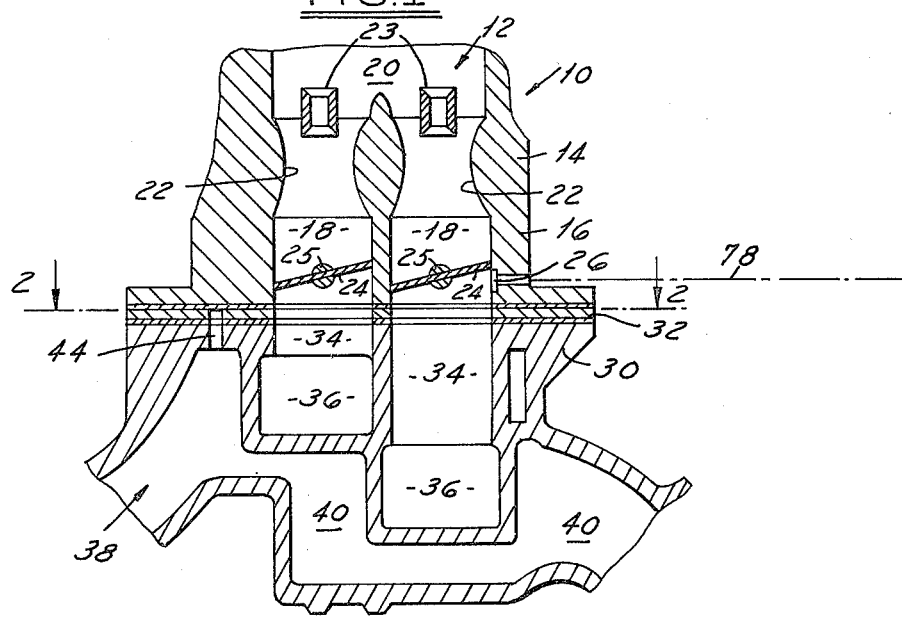
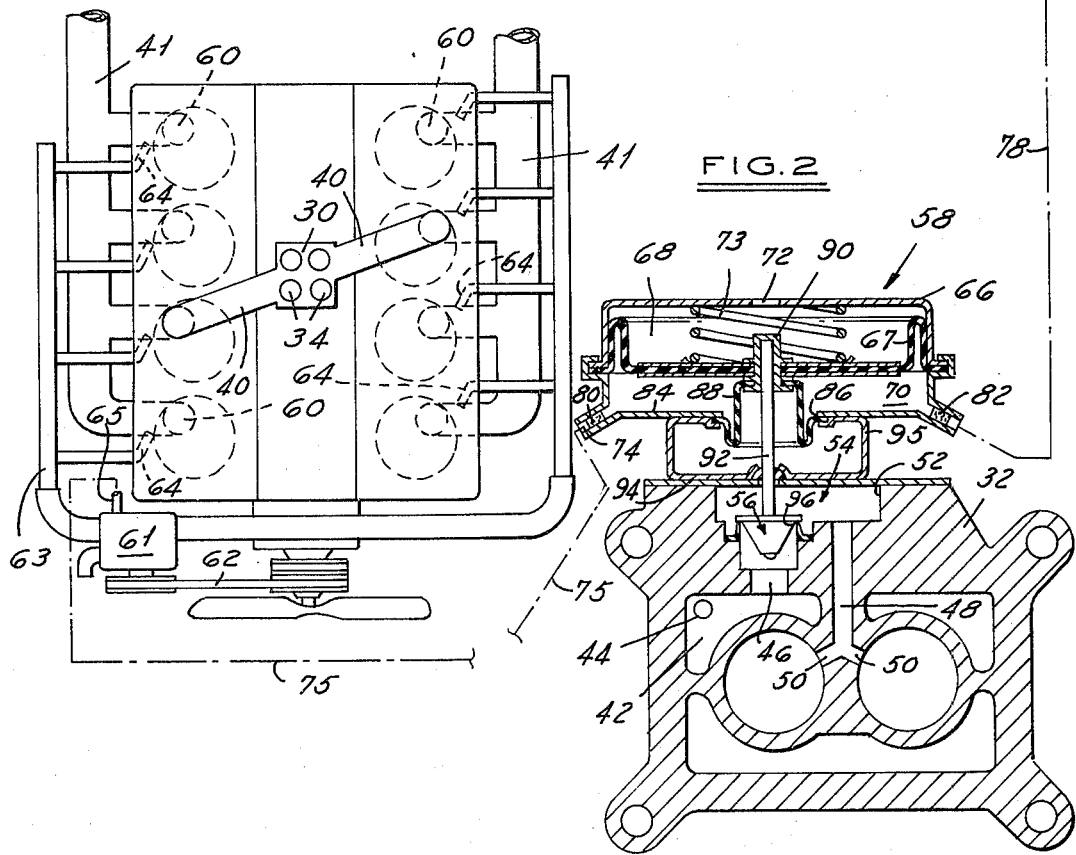

ENGINE AIR PUMP PRESSURE/MANIFOLD VACUUM CONTROLLED EXHAUST GAS RECIRCULATING CONTROL SYSTEM

This invention relates, in general, to an internal combustion engine. More particularly, it relates to a system for controlling the recirculation of exhaust gases back into the engine through the intake manifold.

Devices are known for recirculating a portion of the engine exhaust gases back through the engine to control the output of oxides of nitrogen. These devices usually consist of a single valve that is spring seated to prevent recirculation of the exhaust gases at undesired times and opened by vacuum from a port above the carburetor throttle valve controlled by movement of the throttle valve.

On the other hand, test results have shown that engine drivability or the engine's tolerance to exhaust gas recirculation (EGR) is best when the EGR is a fixed percentage of the airflow. Since airflow varies as a function of both speed and load, then the EGR flow should also vary in this manner.

The prior art devices, however, generally vary the EGR as a function of load only, by varying EGR flow as a function of manifold vacuum levels. Therefore, at light load operation, when only a small percentage of EGR is necessary for emission control, the maximum rate of EGR flow is obtained because ported vacuum is high causing the EGR valve to open wide. Similarly, at high engine speeds and loads, a high EGR flow rate can be tolerated without deteriorating engine drivability, and yet in the prior art devices, the low manifold vacuum present would only permit a low EGR flow rate.

Therefore, it is an object of this invention to provide an EGR device that varies EGR flow as a function of both speed and load so that the flow is a more nearly constant percentage of airflow.

Some engines have air injection systems that add air to the exhaust ports from an engine driven air pump to reduce unburned hydrocarbons and carbon monoxide to $H_2O$ and $CO_2$, for example. Since this secondary air pressure varies with engine speed, controlling an EGR valve with secondary air pump pressure will make the valve lift proportional to engine speed. Also, since manifold vacuum varies in inverse proportion to load, by bleeding off a portion of the air pump pressure with manifold vacuum, the valve lift will also vary with engine load.

It is another object of the invention, therefore, to provide an EGR device that varies EGR flow as a function of the differential in forces between air pump pressure and manifold vacuum to provide good emission control with a minimum of sacrifice in engine drivability.

Other objects, features, and advantages of the invention would become more apparent upon reference to the succeeding detailed description thereof, and to the drawings illustrating the preferred embodiment thereof, wherein;

FIG. 1 is a cross-sectional view of a portion of an internal combustion engine and associated carburetor embodying the invention;

FIG. 2 is a cross-sectional view taken on a plane indicated by and viewed in the direction of the arrows 2—2 of FIG. 1; and, FIG. 3 schematically illustrates the engine on which is mounted the invention.

FIG. 1 illustrates a portion 10 of one-half of a four-barrel carburetor of a known downdraft type. It has an air horn section 12, a main body portion 14, and a throttle body 16, joined by suitable means not shown. The carburetor has the usual air/fuel induction passage 18 open at their upper ends 20 to fresh air from the conventional air cleaner, not shown. The passages 18 have the usual fixed area venturies 22 cooperating with booster venturies 23 through which the main supply of fuel is induced, by means not shown.

Flow of air and fuel through induction passages 18 is controlled by a pair of throttle valve plates 24 each fixed on a shaft 25 rotatably mounted in the side walls of the carburetor body.

The induction passages also contain a manifold vacuum sensing port 26.

The throttle body 16 is flanged as indicated for bolting to the top of the engine intake manifold 30, with a spacer element 32 located between. Manifold 30 has a number of vertical risers or bores 34 that are aligned for cooperation with the discharge end of the carburetor induction passages 18. The risers 34 extend at right angles at their lower ends 36 for passage of the mixture out of the plane of the figure to the intake valves of the engine.

The exhaust manifolding part of the engine cylinder head is indicated partially at 38, and includes an exhaust gas crossover passage 40, shown also in FIG. 3. The latter passes from the exhaust manifold 41, shown in FIG. 3, on one side of the engine to the opposite side beneath the manifold trunks 36 to provide the usual "hot spot" beneath the carburetor to better vaporize the air/fuel mixture.

As best seen in FIG. 2, the spacer 32 is provided with a worm-like recess 42 that is connected directly to crossover passage 40 by a bore 44. Also connected to passage 42 is a passage 46 alternately blocked or connected to a central bore or passage 48 communicating with the risers 34 through a pair of ports 50. A recess 52 in the side of the spacer defines a chamber 54 through which passages 46 and 48 are interconnected.

As described above, it is necessary and desirable to provide a control to prevent the recirculation of exhaust gases at undesirable times. For this purpose, passage 46 normally is closed by a valve 56 that in this case is sensitive to both speed and load and is moved to an open position by a servo 58.

FIG. 3 shows schematically a plan view of a portion of a conventional V-8 internal combustion engine 10 having right and left banks of cylinders each with exhaust ports 60. Also shown is an air injection system consisting of an air pump 61 driven by the engine through a belt 62 to deliver air to each exhaust port through manifolding 63 and injectors 64. The air combines with the unburned hydrocarbons and carbon monoxide that pass into the exhaust system and reduces them to $H_2O$ and $CO_2$. The air pump has a third outlet 65.

As seen in FIG. 2, the servo 58 includes a shell 66 divided by an edge mounted flexible diaphragm 67 into two chambers 68 and 70. Chamber 68 is an air chamber, being vented at 72. It contains a light positioning spring 73. Chamber 70 is a differential pressure chamber. It has an inlet 74 connected by a passage 75 to the air pump passage 65, and a second inlet 76 connected by a passage 78 to the manifold vacuum sensing port 26 in FIG. 1. Both inlets 74 and 76 contain fixed area orifices or flow restricting devices 80 and 82, 82 being of a smaller flow area than 80. The chamber 70 thus is essentially an air pressure chamber, with the manifold vacuum through the smaller orifice bleeding down the air pressure signal at times.

The lower portion 84 of shell 66 has an opening 86 that is sealed by a rolling type annular flexible seal 88. The latter is secured to a boss 90 also secured to diaphragm 67. The boss is screwed to the upper end of the stem 92 of valve 56. Valve 56 slidable and sealingly projects through a plate 94 closing chamber 54, and a cup-shaped supporting member 95. The valve per se is a tapered poppet like valve cooperating with a seat 96.

Before proceeding to the operation, it should be noted that the size of orifices 80 and 82 and the area of diaphragm 67 will be a matter of choice to provide the desired action since the desired valve signal to open the EGR valve 56 is created by controlling these variables. That is, by varying the orifice sizes, the signal can be made more or less sensitive to either air pump pressure or manifold vacuum changes.

In operation, at idle with high manifold vacuum and low air pump pressure, the resultant differential force in chamber 70 plus the atmospheric force in chamber 68 forces valve 56 downwards onto seat 96 and prevents flow of gas through passage 48. The forces created by spring 73 are chosen to be only slight. As the throttle valve is moved off idle, the load will increase, which will decrease manifold vacuum and begin to increase vehicle speed. As the vehicle speed and load increases, the increasing air pump pressure force begins to exceed the opposing atmospheric force in chamber 68 and the decay of the air pressure by the manifold vacuum. This moves valve stem 92 upwards and allows exhaust gas to flow to the intake manifold through passage 48.

For light loads and low vehicle speeds, the EGR flow rate will be low. For heavier loads and higher vehicle speeds, the EGR flow rate will increase. It will be seen therefore, that the signal force to valve 56 will vary with changes in engine speed (air pump pressure) or load (manifold vacuum), or both, to produce an EGR flow that is a constant percentage of intake airflow.

From the foregoing, therefore, it will be seen that the higher the load and speed, the more EGR is added without materially reducing engine drivability. Thus, at idle speed, no EGR occurs, and at heavier loads/higher speeds, a maximum amount of EGR is added.

While the invention has been shown and described in its preferred embodiment, it will be clear to those skilled in the arts to which it pertains, that many changes and modifications may be made thereto without departing from the scope of the invention.

I claim:

1. An exhaust gas recirculating system, comprising, in combination, an internal combustion engine having an air pump driven by the engine, the air pump producing a supply of air increasing in pressure in proportion to engine speed, and an engine manifold vacuum sensing port, the system comprising, a duct connecting the exhaust gases to the engine intake manifold, a speed and load responsive spring closed valve movable by the differential force between engine manifold vacuum and air pump pressure operatively acting on the valve to open the duct, a servo means for moving the valve, the servo having a flexible diaphragm dividing the servo into a pressure chamber and an ambient air pressure chamber, means connecting the diaphragm to the valve, spring means biasing the diaphragm to a valve closed position, the pressure chamber having a first opening connected to the air pump and a second opening connected to the manifold vacuum port, and flow restricting means in the first and second openings.

2. A system as in claim 1, the manifold vacuum opening restrictor being of a smaller flow area than the air pump opening restrictor.

3. An exhaust gas recirculating system, comprising, in combination, an internal combustion engine having an air pump driven by the engine, the air pump producing a supply of air increasing in pressure in proportion to engine speed, the engine having intake and exhaust manifolding and a carburetor with an induction passage connected to the intake manifold and having a manifold vacuum sensing port therein, a duct connecting portions of the intake and exhaust manifolding for recirculating exhaust gases back into the engine, a valve movable between alternate positions to open and close the duct, and a load and speed sensitive servo connected to the valve for moving the same, the servo having a plunger connected to the valve, and differential force means acting on the plunger to open the duct as a function of the differential in pressure between air pump pressure and manifold vacuum conjointly operatively acting on the plunger in one direction opposed by ambient pressure operatively acting on the plunger in the opposite direction.

4. A system as in claim 3, including an annular flexible diaphragm member connected to the plunger and separating the ambient pressure force from the differential manifold vacuum and air pressure force.

5. A system as in claim 4, the diaphragm member defining an ambient air pressure chamber on one side and a differential air pressure and manifold vacuum force chamber on the other side, a pair of conduit means connecting air pump pressure and manifold vacuum separately to the second chamber, and an orifice in each of the conduit means, one of the orifices having a different flow area than the other.

* * * * *